(12) United States Patent
Bilak

(10) Patent No.: US 7,069,990 B1
(45) Date of Patent: Jul. 4, 2006

(54) ENHANCED OIL RECOVERY METHODS

(75) Inventor: Roman Bilak, Calgary (CA)

(73) Assignee: Terralog Technologies, Inc., Calgary (CA)

( * ) Notice: Subject to any disclaimer, the term of this patent is extended or adjusted under 35 U.S.C. 154(b) by 670 days.

(21) Appl. No.: 10/031,195

(22) PCT Filed: Jul. 12, 2000

(86) PCT No.: PCT/CA00/00819

§ 371 (c)(1),
(2), (4) Date: Jan. 15, 2002

(87) PCT Pub. No.: WO01/06089

PCT Pub. Date: Jan. 25, 2001

(30) Foreign Application Priority Data

Jul. 16, 1999 (CA) .............................. 2277528

(51) Int. Cl.
E21B 41/00 (2006.01)
E21B 43/20 (2006.01)
E21B 43/26 (2006.01)

(52) U.S. Cl. ...................... 166/271; 166/268; 166/270; 166/270.2; 166/272.2; 405/129.35; 405/129.4

(58) Field of Classification Search ................. 166/268, 166/270, 270.2, 272.2, 271; 405/129.35, 405/129.4

See application file for complete search history.

(56) References Cited

U.S. PATENT DOCUMENTS

| 3,513,100 | A | | 5/1970 | Stogner |
| 4,374,544 | A | * | 2/1983 | Westerman et al. ...... 166/252.4 |
| 4,787,452 | A | | 11/1988 | Jennings, Jr. |
| 4,848,460 | A | * | 7/1989 | Johnson et al. ........... 166/245 |
| 4,989,671 | A | * | 2/1991 | Lamp .......................... 166/53 |
| 5,108,226 | A | | 4/1992 | Jennings, Jr. |
| 5,133,624 | A | | 7/1992 | Cahill |
| 5,191,157 | A | | 3/1993 | Crocker |
| 5,226,749 | A | | 7/1993 | Perkins |
| 5,314,265 | A | | 5/1994 | Perkins et al. |
| 5,318,382 | A | | 6/1994 | Cahill |
| 5,387,737 | A | | 2/1995 | Schmidt et al. |
| 5,405,224 | A | | 4/1995 | Aubert et al. |
| 5,463,164 | A | | 10/1995 | Perkins |
| 5,484,231 | A | | 1/1996 | Cannan et al. |
| 5,489,740 | A | | 2/1996 | Fletcher |
| 5,536,115 | A | | 7/1996 | Keck |
| 5,589,603 | A | | 12/1996 | Alexander et al. |
| 5,734,988 | A | | 3/1998 | Alexander et al. |
| 5,957,202 | A | * | 9/1999 | Huang ..................... 166/272.3 |
| 6,002,063 | A | | 12/1999 | Bilak et al. |
| 6,170,667 | B1 | | 1/2001 | Bilak et al. |
| 6,287,248 | B1 | | 9/2001 | Bruno et al. |

OTHER PUBLICATIONS

Dusseault, Maurice B. et al., *Slurry Fracture Injection* Hazardous Materials Management, Feb., 1995.

(Continued)

*Primary Examiner*—David Bagnell
*Assistant Examiner*—Giovanna Collins
(74) *Attorney, Agent, or Firm*—Spencer Fane Britt & Browne LLP; Kyle L. Elliott

(57) ABSTRACT

A process for enhanced oil recovery from an extraction operation comprises the steps of selection of an appropriate hydrocarbon bearing stratum; providing at least one production well and one injection well; and injecting into the target stratum a slurry formed from sand, viscous liquids or oily sludge, which is delivered at or near formation fracture pressures. Monitoring of bottom hole pressure is carried out, to permit delivery of the slurried wastes in a series of injection episodes, in which the length of the episodes and interinjection periods is determined by maintaining the bottom hole pressure within a preselected range. The position and spread of the slurried wastes within the target stratum may be monitored through the use of additional monitoring steps.

20 Claims, 2 Drawing Sheets

OTHER PUBLICATIONS

Dusseault, Maurice B., *Slurry Injection Disposal of Granular Solid Waste*, Geoconfine, 1993.

Bruno, M.S., et al. *Economic Disposal of Solid Oil Field Wastes Through Slurry Fracture Injection*, SPE 29646, Mar. 9, 1995.

Sipple–Srinivasan, Margaret, et al., *Field Experiences With Oilfield Waste Disposal Through Slurry Fracture Injection*, SPE 38254, Jun. 23–27, 1997.

Dusseault, Maurice B., et al., *Disposal of Radioactive Wastes by Slurry Fracture Injection*, Conference Paper, Sep., 1996.

Bruno, M.S., et al., *Economic Disposal of Solid Oilfield Wastes*, E&P Exchange, Sep., 1995.

Dusseault, Maurice B., *Slurry Fracture Injection The Disposal of Granular Solid Wastes in Western Canada*, Hazardous Materials Management, Feb., 1995.

Gilluly, James, et al. *Principles of Geology*, 1959, p. 461.

Stanley N. Davis and R. Oger J.M. Dewiest, *Hydrogeology*, 1966, pp. 176, 181–182.

J.D. Ferris, et al., *Theory of Aquifer Tests, Geological Survey Water–Supply Paper* 1536–E, 1962, p. 76.

John Hnatiuk and J.W. Martinelli, *Field Case Histories, Oil and Gas Reservoirs*, SPE Reprint Series, No. 4a, 1975, pp. 7–8.

C.S. Hasse, et al., *Proceedings of Waste Management '85*, Mar. 25–28, 1985, p. 1.

Robert C. Earlougher, Jr., *Advances in Well Test Analysis*, SPE Marathon Oil Co., 1977, p. 1.

Subhash N. Shah and Yung N. Lee, *Friction Pressures of Proppant–Laden Hydraulic Fracturing Fluids*, SPE Production Engineering, Nov. 1986, p. 437.

*Well Completions*, SPE Reprint Series No. 5a, vol. 1, 1978, Table of Conents, pp. 150 and 170.

H.O. Weeren et al., *Disposal of Radioactive Wastes by Hydraulic Fracturing*, Oak Ridge National Laboratory, Report No. ORNL/CF–81/245, May 1982, pp. 1 and 18.

H.O. Weeren et al., *Hydrofracture Site Proof Study at Oak Ridge National Laboratory*, Report No. ORNL–TM–4713, Nov., 1974, pp. 20, 21, 26 and 27.

W. De Laguna, et al., *Engineering Development of Hydraulic Fracturing as a Method for Permanent Disposal of Radioactive Wastes*, Report No. ORNL–4259, Aug., 1968, Table of Contents, pp. 48, 51, 187 and 188–201.

G.R. Holzhausen, et al., *Hydraulic–fracture Growth in Dipping Anisotropic Strata as Viewed Through the Surface Deformation Field*, 26$^{th}$ U.S. Symposium on Rock Mechanics, Rapid City, SD, Jun. 26–28, 1995, pp. 341–353.

Kenneth G. Nolte and Michael B. Smith, *Interpretation of Fracturing Pressures*, Journal of Petroleum Technology, Sep., 1981, pp. 1768 and 1770.

G.R. Holzhausen, et al., *Results of Deformation Monitoring During Stem Stimulation in a Single–well Test*, Proceedings of Applied Oilstands Geoscience, Jun. 11–13, 1980, pp. 1–40.

K.G. Nolte, *Application of Fracture Design Based on Pressure Analysis*, SPE Production Engineering Journal, Feb., 1988, pp. 31 and 27.

G.R. Holzhausen and H.N. Egan, *Detection and Control of Hydraulic Fractures in Water Injection Wells*, SPE 16362, SPE California Regional Meeting, Apr. 8–10, 1987, pp. 379–385.

* cited by examiner

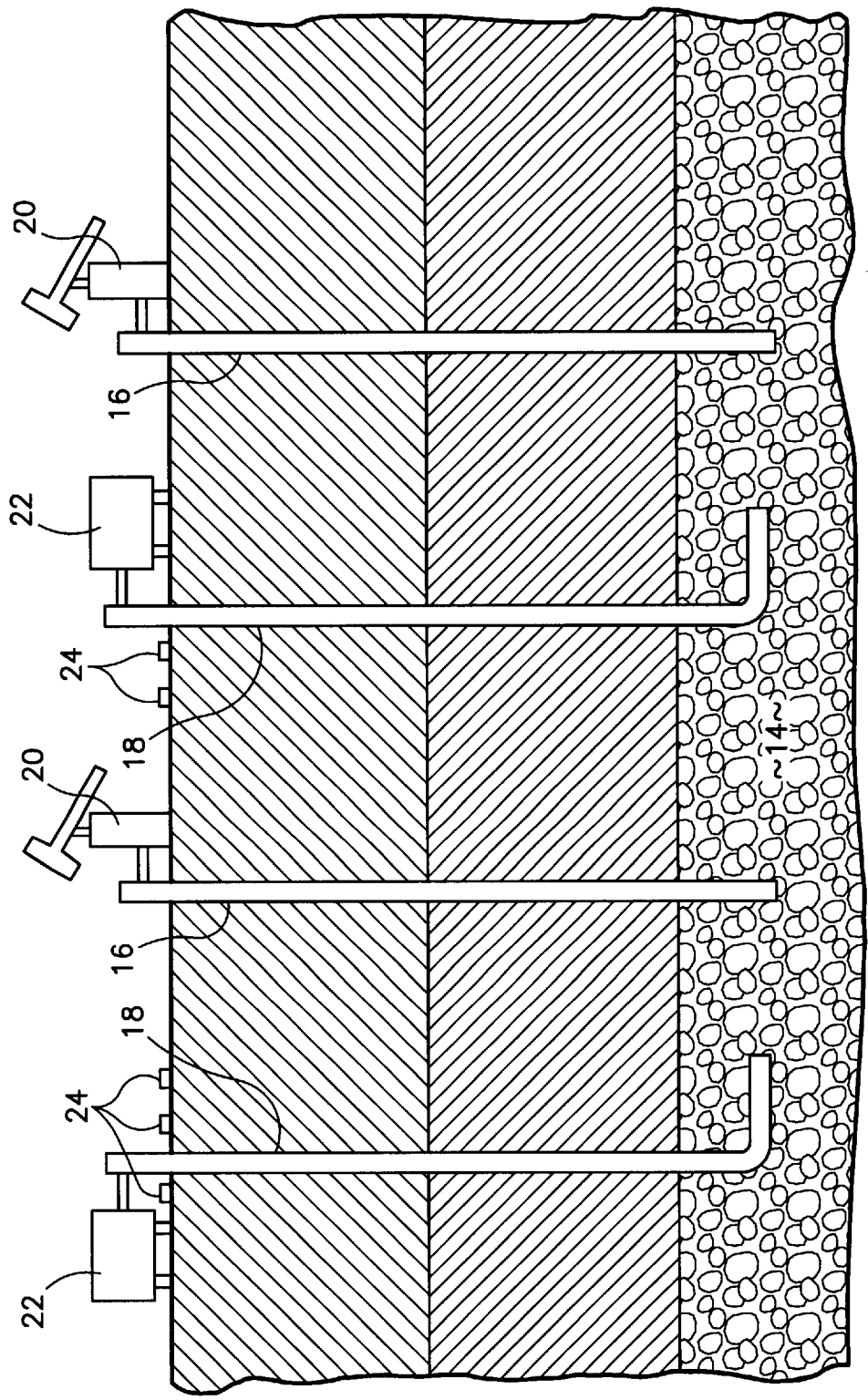

ENHANCED OIL RECOVERY METHODS

This is the United States National Stage of Patent Cooperation Treaty Application No. PCT/CA00/00819 filed Jul. 12, 2000, which claims priority to Canadian Patent Application No. 2,277,528 filed Jul. 16, 1999.

FIELD OF THE INVENTION

The present invention relates to recovery of liquid hydrocarbons from geologic reservoirs, and in particular enhanced oil recovery ("EOR") by high pressure injection of substances into a reservoir for enhancing recovery of desirable oil from the reservoir, and in further particular, to the fracture-inducing injection of waste material in slurried form for achieving "EOR".

BACKGROUND OF THE INVENTION

Oil recovery using EOR processes conventionally involves the injection of fluids under pressure into an oil bearing stratum in the vicinity of production wells. Desirably, the fluids drive oil from the pores and other interspecies within the stratum, thereby achieving an enhanced recovery of the desirable hydrocarbons. The fluids may be heated for improvement of the process.

A major difficulty encountered in enhanced oil recovery processes that involve the injection of fluids is the phenomenon of channeling. Under the high pressure gradients associated with injection, the injected fluids, which are usually less viscous than the oil in the pores, preferentially flow within the channels ("worm holes") present within the formation with greater permeability relative to the target hydrocarbons, leading to early breakthrough of fluids to nearby production wells. A large number of patented processes have been developed in order to try to reduce this phenomenon of early breakthrough. These processes involve viscosity-graded fluids, special blocking agents, foams that set with time, and so on. However, all of these various processes have deficiencies in practice. The re-initiation of high-pressure injection usually leads once again to breakthrough, either in the same channel, or in other paths of higher relative permeability. It should be pointed out that this pressure-induced breakthrough is an entirely natural process characteristic of heterogeneous reservoirs. (Note that channeling in high-permeability streaks is not the same as viscous fingering, which occurs even in completely homogeneous reservoirs.)

It is an object of the present invention to achieve an improved EOR process, which at the same time disposes of various wastes within an oil bearing stratum, thereby achieving a generally permanent disposal of wastes. It is contemplated that the dual results thereby achieved will result in significant economic benefits, thereby to rendering oil recovery economically feasible in heretofore uneconomic deposits.

It has previously been proposed to enhance oil production by injecting sand or other wastes within the oil bearing stratum. However, this idea has been rejected, largely due to poor understanding of the nature of the injected sand bodies and other processes within the reservoir. However, when directed to appropriate target strata and with appropriate monitoring, EOR may be achieved by means of injecting sand or other wastes within a target stratum.

The development by the present inventors and others of the Slurry Fraction Injection (herein "SFI") (TM) process to economically dispose of sand and waste liquids raises the possibility of deliberate fracture-inducing injection of wastes within appropriate reservoirs as a means of increasing the recoverable oil, or aiding other recovery processes. These include cold heavy oil production ("CHOP"), horizontal well extraction or thermal oil production stimulation. Of particular interest is the use of the large volumes of waste sand generated during CHOP for enhancement of oil extraction.

Successful SFI disposal of aqueous slurries containing sand and waste liquids from oil production operations such as stable emulsion and slops has been achieved, wherein substantial volumes of sand and waste liquids have been injected into target formations. Such projects range in depth from 360 meters to 1260+meters, in formations that are either oil free, depleted, or that contain uneconomic amounts of oil in the pore space. A typical SFI project involves daily injection episodes of up to 800 cubic meters of slurry over a time interval of 8–12 hours. The slurry has a density of approximately 1200 kg/m$^3$, and is injected under pressure that exceeds the overburden weight in order to achieve fracturing within the formations. It has proven feasible to add substantial amounts of liquid wastes containing viscous oil.

Different target formations have been used for SFI at different sites. The most suitable formations are quartz-rich permeable and unconsolidated sandstones. These sands have permeabilities as high as 2–4 Darcy. In other target formations, comprised of finer grained sandstones, permeability values on the order of 0.5 to 2 Darcy have been measured. Individual wells used for SFI have, in some cases, received total sand volumes in excess of 30,000 cubic meters of sand, along with smaller volumes of oily waste fluids.

Careful monitoring of the SFI process both during and after injection episodes leads to the conclusion that the sand and viscous oil wastes are remaining relatively close to the injection well. Transmission of sand, oily wastes, or aqueous carrying fluids to higher formations seems not to occur, providing the SFI operations are conducted properly. Analysis of the injection pressures during active SFI shows that the solid material and the viscous fluids are entering the formation in the form of discrete fractures. Because the formations generally have a high permeability, the aqueous portion of the slurry is rapidly dissipated into the surrounding porous medium under the influence of the local high pressure gradients. These high pressure gradients are an actual consequence of the SFI process: the pressure in the slurry is somewhat higher than the overburden weight, and pressure in the liquid in the far field is much less than this value. For example, at 500 m depth, SFI pressures of 12–13 MPa are used, but the far-field pressures in the zones are about 4 MPa, giving very large pressure gradients that act to dissipate the pressures rapidly.

During disposal of wastes by means of SFI into oil-free sand strata, a region of lower permeability is generated around the wellbore. This low permeability region develops because the injected sand is usually more finegrained than the formation sand, and also contains approximately 2–5% viscous oil coating the sand grains. If waste fluids that contain large amounts of viscous oil are also injected at the same time, the permeability blocking effect is even greater. These conclusions are arrived at through careful analysis of the pressure decline curves following each SFI episode. In fact, the systematic analysis of pressure decline data forms a critical part of the monitoring and evaluation activity for SFI projects.

SUMMARY OF THE INVENTION

It is an object of the present invention to provide a process for enhanced oil recovery within a target stratum, through a fracture-inducing injection of slurried waste material into the stratum. It is a further object to achieve enhanced oil recovery through the injection of either waste sand in slurried form or viscous liquids and oily sludge in the form of a slurry.

These and other objects may be achieved through the use of a process which comprises in one aspect the steps of:

selection of a target stratum having the following characteristics:
permeable, porous, unconsolidated, laterally continuous sandstones or other hydrocarbon bearing strata into which injectivity can be maintained;

providing at least one oil production well entering into said target stratum; providing at least one injection well in the region of said production well;

providing a supply of slurried wastes comprising sand or viscous liquids or oily sludge in slurried form;

delivering the slurried wastes into the target stratum at or near formation fracture pressures;

monitoring on a continuous basis bottom hole pressure ("bhp") of the slurried wastes and delivering the slurried wastes into the injection well in a series of injection episodes separated by interinjection episodes, whereby each of said injection episodes terminates approximately upon determining an increase in the bhp above a first selected level, and the interinjection episode terminates approximately upon determining a drop in bhp below a second selected level, thereby maintaining a generally constant bottom hole pressure between the first and second levels throughout the injection process, thereby achieving a generally continuous long term waste disposal;

recovering desirable hydrocarbons through the production well or wells.

In a further aspect, additional information and data is collected on a generally continuous basis to monitor the position and spread of the slurried wastes within the target stratum. Such monitoring may be carried out through the use of surface deformation information, preferably using a relatively dense array of surface tilt meters in the region around the injection well. Further monitoring may be carried out by micro-seismic monitoring in the region surrounding the injection well. The bottom hole pressure within the injection well is analyzed in terms of pressure fall off analysis, fracture propagation analysis, and other forms of analysis of the pressure data. Bottom hole pressure may also be measured within other wells within the target stratum that are not being actively used for injection or production.

In a further aspect, the slurry is tagged with a marker for identification in the event a breakthrough develops through adjacent production wells, in which event the slurry injection process may be immediately shut down. Further analysis may be achieved through the use of the following:

wellbore logs on injection and production wells;
wellbore temperature and tracer logs on the injection and production wells;
inter-well tracer tests conducted prior to initiating the waste injection;
initial matrix injectivity tests below fracture pressure using only water as an injection medium;
multi-rate tests and mini-frac test using water or alternatively slop/slurry;
daily production rate monitoring;
inter-well tracer tests during the injection period;
review of the geology of all wells in the area and the production and injection history prior to commencing the procedure.

In a further aspect, a sand slurry is injected into the injection well, with the slurry comprising a minimal water component between 50%–90% by volume. In another aspect, the water component may be between 40% and 95% by volume.

In a further aspect, migration of the wastes through permeability channels is minimized by conducting inter-well tracer tests prior to initiation of the slurry injection, to assess the channel orientation, and initiating with the injection stream either dominantly vertical fracturing; directional horizontal; a combination of directional horizontal and dominantly vertical; or predominantly radial fracture injection around the injection well.

In a further aspect, the injection rate of sandy wastes is maintained so that the depletion index comprising total sand, water and oil production divided by total sand, water and slop injection is maintained at close to 1.0, meaning ±10%, following an initial period during which the depletion index is higher than 1.0. In another aspect, "close to 1.0" is ±25%.

In a further aspect, the production well is maintained at close to pumped off conditions for minimizing the sand volumes produced during the process. In order to achieve this, the production well is arranged to recycle oil down the annulus during the period that the sand slugs.

In a further aspect, the slurried wastes comprise a viscous waste oil component in sufficient concentration to generally block the channels formed within a target stratum. This will have the effect of directing the fluids elsewhere, thereby generally evenly dispersing the injected materials within the target stratum for effectively driving out the desirable hydrocarbons away from the region of the injection well and into the region of the production well or wells. The concentration of viscous oils and other liquids within the slurry is sufficiently high to provide suitable blocking of channels within the target stratum, but not sufficiently high to lead to undesirable hydraulic fracture induced channels within the target stratum. Analysis of the above-referenced monitoring processes may be directed to achieving the appropriate concentration level of fluids within the slurry, whereby the degree of channel blocking and hydraulic fracturing channeling is monitored on a continuous basis during the injection process. In general, the word "approximately" or equivalent terminology, means ±10%, unless otherwise specified.

Having thus generally characterized the invention, the invention will now be further described by way of reference to specific embodiments thereof.

BRIEF DESCRIPTION OF THE DRAWINGS

The FIG. 1 is the schematic illustration of an oil production site, illustrating the processes according to the present invention.

FIG. 2 is a schematic illustration of horizontal injection wells in place at an oil production site illustrating a process according to the invention.

DETAILED DESCRIPTION OF THE PREFERRED EMBODIMENTS

Figure 1:
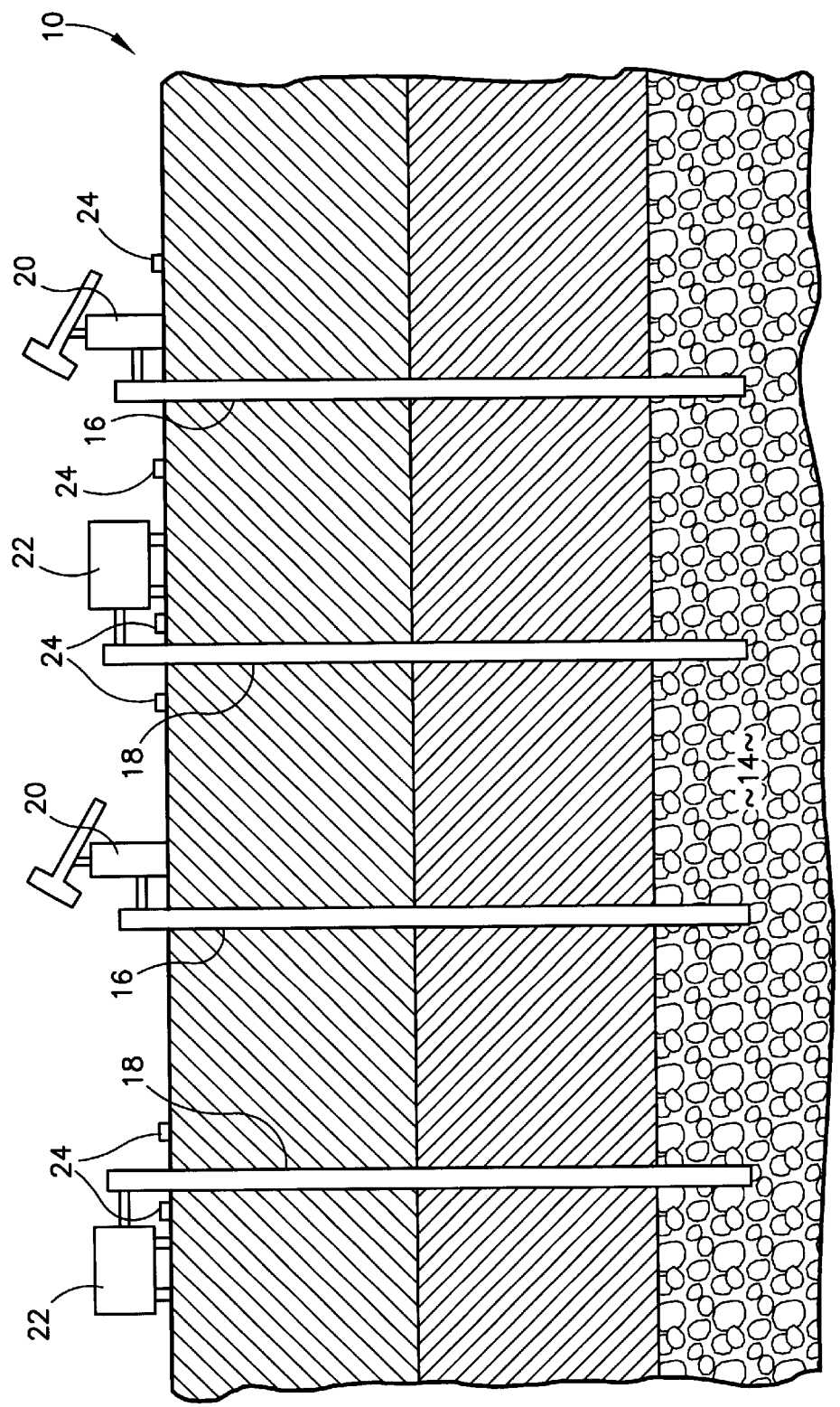

The process according to the present invention is carried out in the context of a generally conventional oil production site 10, illustrated in FIG. 1. A target stratum 14 is overlain by overburden. An array of production wells 16 enter the target stratum. One or more injections wells 18 are interspersed between the production wells. Conventionally, the injection wells comprise former production wells that have been depleted. Generally conventional oil extraction equipment 20 is associated with the production wells 16, and slurry injection equipment 22, which may be of the type described in Applicants co-pending U.S. application Ser. No. 09/919,070 is associated with the injection wells 18. An array of conventional surface tilt meters 24 are positioned in the region around each injection well to measure surface deformation.

An appropriate distribution of the production wells is discussed below, in the context of one embodiment of the invention.

According to a first embodiment, the slurry injected within the injection well 18 incorporates a selected concentration of viscous, oily waste fluids. The effect of such process may be better understood by reference to conventional oil recovery fluids, such as hot water, various chemicals, etc.

In the first embodiment, enhanced oil recovery fluids such as hot water or various chemicals can be injected along with small amounts of viscous, oily waste fluids. This injection will usually be carried out at or near formation fracture pressures. The high fluid pressure gradients around the injection well will cause the fluid to migrate preferentially in the sands of greater relative permeability, as well as through any induced fractures. The induced fractures would typically be formed closer to the wellbore because of pressure bleed-off, whereas high-pressure flow through the pores will dominate at a greater distance from the wellbore where there are no induced fractures. The viscous waste oil carried as part of the enhanced recovery fluids will tend to block the pores in the channel where flow is dominant. This will thus tend to block the channeling paths, creating a tendency for fluids to flow elsewhere. In this regard, the mechanism is quite similar to the premise behind the emplacement of conventional prior art blocking agents: flow is preferential into the paths of greater relative permeability, which are therefore blocked.

Disposal of waste fluids containing some proportion of viscous oil could help in reducing the effect of channeling in heterogeneous porous strata. However, too high a content of viscous oil will lead to undesirable hydraulic fracturing and subsequent channeling; too low a content of viscous oil will lead to insufficient blocking capability. Selection of an appropriate range of viscous oil concentration may be achieved through the use of monitoring data. Careful analysis of all pressure records, optionally combined with microseismic monitoring and analysis of surface deformation, will allow quantification of the process, leading toward an optimization state. A number of variables can be altered to achieve optimum conditions; these include injection rate, oil content, differential pressure, EOR additives, temperature, and so on. These can be altered in response to the behavior at production wells and in response to the monitoring information.

According to a further aspect, an injected slurry incorporates a selected concentration or range of concentrations of waste sand. Injection of sand is particularly desirable in the context of cold heavy oil productions processes, as discussed above.

A great deal of sand must be disposed in an environmentally sound manner during any oil production project using CHOP approaches. Much of this sand can be viewed as being relatively clean, in that it does not contain sufficient oil to fully block the porosity of the formation/reservoir sand, which would lead to a low relative permeability to aqueous fluids. Consider the case of a heavy oil reservoir into which large amounts of produced sand are being injected. In this case, the relative permeability of the natural sand reservoir is lower than the permeability of the injected sand body. Furthermore, the contact area between the injected sand body in the natural formation is substantial because the configuration of the injected sand body within the formation conforms to the fractures and other interstices within the formations. After some amount of time, once a specified volume of sand is injected, the disposal well could be converted to a well in which hot fluids or other agents to promote enhanced oil recovery are injected. The performance of this process is enhanced by the presence of a permeable sand body that has been emplaced within the formation. In other words, because the waste sand is deposited relatively near the injection well, the development of long extended flow channels, characteristic of low viscosity fluid flow into a reservoir filled with a higher viscosity fluid, would be lessened. The emplaced sand body will facilitate a better distribution or areal conformance of any injected EOR fluids. Because channeling is dominantly controlled by both viscosity differences and high local pressure gradients, the generation of a larger, more permeable zone near the wellbore will suppress the channeling phenomenon. High gradients will no longer develop in the region immediately surrounding a the wellbore, but farther out in the formation, near the interface between the injected sand (higher relative permeability) and the virgin heavy oil strata (lower relative permeability).

Depending on the enhanced oil recovery process to be implemented, clean sand injection will bring certain benefits to the reservoir. Along with the injected sand, a volume of aqueous fluids is injected consisting of 4–6 times the volume of the sand. It is known from monitoring of SFI projects that the orientation of the injection-induced fracture changes from day-today. Thus, instead of the aqueous liquids flowing down a single permeable channel, the induced fracture network around the injection well generally consists of a large number of stringers of sand, each comprising a relatively permeable channel. The existence of a large number of fractures means that the pressure gradients at the tips of these fractures will generally be low; this is an aid in reducing the tendency for dominant flow within a single channel. However, it is important that the more permeable sand-filled fractures not intersect any underlying water zones, or any other low oil saturation zones of substantially higher relative permeability.

As in the case of injection of oily fluids, under appropriate circumstances, the injection of large volumes of relatively clean sand is an aid to enhanced oil recovery. However, similarly to the situation in fluid injection, it will be necessary to optimize the process in a field mode, collecting relevant data and using that data intelligently and continuously to modify the process on a day-to-day basis. Careful monitoring is critical to the process of evaluation of sand and fluid waste injection as a means of increasing oil recovery ratios.

Another use of injected sand is in thermally assisted gravity drainage processes (e.g. "SAGD") or in vapor-assisted petroleum injection ("VAPEX"). For these processes to be successful, flow communication to a large reservoir volume is necessary. If there are low-permeability linterbeds, vertical growth will be impeded. One way to overcome this is to inject waste sand without slops at various points along a horizontal well, as seen in FIG. 2, so that vertical fractures develop, passing through the permeability barriers. The injected fluids will then be able to pass through the scaley interbeds and access the upper parts of a reservoir, increasing the potential return (oil rate and volume) for gravity-dominated processes. Any more permeable paths created in this manner will not lead to channeling in gravity processes because pressure gradients are deliberately kept low enough so that gravity drainage forces dominate. There does not appear to be any particular merit in using expensive fracturing fluids and special proppants; if thick, sand-filled fractures can be generated for example, by SFI techniques, it will suffice to use waste sand as the proppant and SFI approaches as the placement method.

The injection processes described above require for their success appropriate monitoring of the formation responses to the injection process. Appropriate monitoring may be carried out by way of the following:

- collection of continuous formation/reservoir pressure data during all injection episodes and inter-injection episodes, complemented by pressure fall off analyses, fracture propagation analyses, and optionally or other analyses;
- collection of surface deformation information using a relatively dense array of surface tilt meters, which in one version may consist of approximately 20 to 24 sites, arrayed in optimal locations, so that the shape of injected bodies can be resolved;
- installation and monitoring of a micro-seismic monitoring array to attempt to localize more precisely the geometrical limits of the injected sand bodies;
- analysis of all injection and production data from the wells involved;
- collection of pressure information from the hole bottom of any offset wells that are not being actively used for injection or production;
- tagging of the aqueous slurry portion injected into the waste injection well with a geochemical carrier for rapid fluid identification if breakthrough develops to adjacent production wells; and
- on-line analysis, preferably with at most a 24-hour turnover, so that specific actions in the injection and production wells can be taken in an effort to achieve optimal process control conditions;
- bond logs on injection and production wells;
- wellbore temperature/tracer logs on all injection and production wells;
- interwell tracer test prior to initiating the sand or viscous fluid wastes injection EOR scheme;
- Initial matrix injectivity tests below fracture pressure using only water;
- multi rate test and mini-frac test using water (or slop if required);
- daily production rates, using tank levels, daily BS&W and fluid levels at the production wells;
- interwell tracer tests during the injection period (this will help to determine the flow regime from the injection to the production wells (i.e. Linear, radial or slug flow)). Preferably one tracer that follows the water phase and the other the slop phase;
- review of the geology of all wells in the area and the production and injection history prior to starting test;
- review drilling completions and any special logs or tests on the wells.

Most heavy oil reservoirs are at below hydrostatic pressure. The initial reservoir pressures generally have a gradient of 5.0 kPa/m. Normal hydrostatic pressure is 10.0 kPa/m. During the normal production history, a cold production well will typically have average reservoir pressure gradients of 2.5 kPa/m. The normal injection pressure for SFI is in the range of 20 kPa/m. Therefore, for the same bottom hole producing pressure, assuming the well is pumped off, the pressure drop to flow in the reservoir would increase from 2.5 to 20.0 kPa/m, which should result in approximately an 8 fold increase in the oil production rate. In the early life of the field, when the reservoir pressure is high, this would likely generate only a 4 fold increase. Therefore, the expected oil rate increase is in the range of 4–8 times the cold production rates. This would be a significant increase in the oil production rates. The other benefit is that under primary cold production the reservoir pressure declines over time as the solution gas is produced, whereas under the sand or viscous fluid wastes injection EOR scheme the average pressure would be maintained with sand slurry injection, basically independent of the solution gas. The only importance of the solution gas would be in maintaining a low oil viscosity. Therefore, the present invention would work more effectively the earlier it is implemented in the life of the field.

For normal cold production the connate water saturation is generally not mobile. This is a prerequisite for cold production to work effectively because of the mobility ratio of oil and water. For typical initial conditions, the relative permeability to oil is 0.5, oil viscosity is 5,000 cp, water relative permeability is 0.001 (typical at SW=15–20%), water viscosity is 1.0 cp and the absolute permeability is 5000 md:

'cp'=centipoise (a measure of viscosity);
'md'=milli-darcy (a measure of permeability).

The mobility ratio is defined as the mobility of the water over the oil as follows:

| | |
|---|---|
| Mobility ratio = | (Krw × Kabs/View) / (Kro × Kabs/Viso) = (0.001 * 5000/1.0) / (0.5 * 5000/5000) = 10 |
| Krw = | Relative Permeability of water |
| Kabs = | Absolute Permeability |
| Visw = | Viscosity of water |
| Kro = | Relative Permeability of oil |
| Viso = | Viscosity of oil. |

Water within a target stratum is about an order of magnitude more mobile than the oil. The mobility ratio is also an important parameter in controlling areal conformance. The higher the mobility ratio the lower the areal conformance. If the initial connate water saturation is mobile (i.e. effective water permeability of 100 md), which would be typical at a water saturation of 50%, the mobility ratio will increase to 1,000,000. Therefore cold production will not work if there is any significant amount of water mobility.

With sand injection for EOR a typical sand slurry will include some oil and water. The oil does present a problem because of its viscosity, but the water being injected is more mobile, and thus will tend to channel to the adjacent producers.

There are a number of possible solutions to this problem:
Inject minimal amounts of water
Create water in oil emulsions (fluid properties similar to oil)
Produce maximum amount of water out of 1 well in a pattern
Minimize sand slurry rates to 50–75 m³/day, with minimal water
Set up a nearby observation well to produce only water with screens so no sand is produced A preference is to minimize the sand slurry rate with minimal water injection.

The incremental recovery above primary production is controlled by the mobility ratio and the areal and vertical conformance of the injected slurry. The vertical conformance is not a serious problem at the injection well due to multiple fracture orientations. However, this is generally a problem at the production well for thick reservoir because the sand production occurs at certain depths only due to the geological depositional model for the field. Overall vertical conformance is not a major problem.

The areal conformance is another major issue. The initial random network of wormholes along with the preferred fracturing directions during SFI complicates the areal conformance of the injected sand slurry. Prior to initiating SFI it is desirable to assess the initial wormhole network by conduction interwell tracer tests. This will tell whether during injection operations it is preferable to induce dominant vertical fracture in a particular direction (i.e. NE-SW) whether to inject the sand radially around the injection well.

Initially, wormholes within the formation may affect the injection pressure and the direction of migration of the sand slurry. The resulting pressure may thus actually be below fracture pressure. Overall, this phase would likely be of minimal duration and the wormholes should plug up relatively quickly. The stress regime is likely to control the areal and vertical conformance of the sand placement, rather than the wormholes.

Most of the cold production well patterns that exist currently are normal 5-spot pattern with equal distance between wells. For SFI the well pattern would typically be elongated in the dominant fracture direction. This will tend to enhance the areal conformance. If large number of vertical wells are available, it is possible to select certain wells that result in an effective elongated pattern. Otherwise, the SFI fracturing strategy will be to maintain the sand in a pattern of generally even radius around the well. This is difficult to do, especially if it is desired to minimize water injection. More slop injection generally has resulted in dominant vertical fractures in one direction.

Fracture confinement is not of significant concern for sand injection EOR. The main limitation is the application of cement casing for the injection wells. Positioning of the production wells adjacent to the injection wells should tend to minimize this difficulty.

The optimum injection rate should be such that the depletion index (total sand, water and oil production divided by total sand, water and slop injection) should be maintained close to 1.0. During the startup of the scheme the depletion index could be high, but after a month or two one should try to maintain a depletion index of 1.0. If this ratio stays high for two long it may result in shear failure at the adjacent wells. Also, if the number is not 1.0, the process will be less predictable, since one can not account for where the sand and fluids are going.

An injection rate of 50–75 m$^3$/day of waste material is a suitable initial rate. For the first month one could inject at higher rate to pressure up the reservoir, but one should stabilize to this rate. Subsequently, the production response is monitored for the surrounding wells and the injection rate is adjusted accordingly. If the resulting production rates are relatively higher one can increase the slurry injection rate.

The optimum production strategy will be to maintain the well at close to pumped off conditions. The term "pumped off" means no fluid is minimized within the annulus of the production well.

There may be significant sand slug being produced during the scheme. Therefore, the production well should be set up so that one has the ability to recycle oil down the annulus to keep the sand cuts to a reasonable level during the period that the sand slugs. The injection water will be preferentially produced at one well. At this well one should try to produce at water rates equal to the injection rate.

What is claimed is:

1. A process for enhanced oil recovery from within a target stratum comprising the steps of:
   - selection of a target stratum having the following characteristics: permeable, porous, unconsolidated, laterally continuous sandstones or other hydrocarbon bearing strata; and
   - providing at least one oil production well entering into said target stratum;
   - providing at least one injection well in the region of said production well;
   - providing a supply of slurried wastes comprising sand or viscous liquids or oily sludge in slurried form;
   - delivering said slurried wastes into the target stratum with sufficient pressure to induce fracturing within said target stratum;
   - monitoring on a continuous basis bottom hole pressure ("bhp") of the slurried wastes and delivering the slurried wastes into the injection well in a series of injection episodes separated by interinjection episodes, whereby each of said injection episodes terminates approximately upon determining an increase in the bhp above a first selected level, and the interinjection episode terminates approximately upon determining a drop in bhp below a second selected level, thereby maintaining a generally constant bottom hole pressure between the first and second levels throughout the injection process thereby achieving a generally continuous long term waste disposal; and
   - recovering desirable hydrocarbons through the production well or wells.

2. A process as defined in claim 1, wherein further analysis is achieved through the use of any of the following:
   - wellbore logs on injection and production wells;
   - wellbore temperature and tracer logs on the injection and production wells;
   - inter-well tracker tests conducted prior to initiating the waste injection;
   - initial matrix injectivity tests below fracture pressure using only water as an injection medium;
   - multi-rate tests and mini-frac test using water or alternatively slop/slurry;
   - daily production rate monitoring; and
   - inter-well tracer tests during the injection period.

3. A process as defined in claim 1, wherein said slurried waste comprises a sand slurry injected into the injection well, with said slurry comprising a water component between 40%–95% by volume.

4. A process as defined in claim 3, wherein said water component is between 50%–90% by volume.

5. A process as defined in claim 1, wherein migration of the wastes through permeability channels is minimized by conducting inter-well tracer tests prior to initiation of the slurry injection, to assess the channel orientation, and initiating with the injection stream one of: dominantly vertical fracturing; directional horizontal fracturing; a combination of directional horizontal and dominantly vertical fracturing; or predominantly radial fracture injection around the injection well.

6. A process as defined in claim 1, for extracting oil from a reservoir within a target stratum wherein extraction is otherwise hindered by a low-permeability interbed, said process comprising the step of providing said injection well in a generally horizontal orientation; delivering said slurry in the form of waste sand without viscous liquids or oily sludge, wherein said slurry is delivered at or above formation fracture pressures for generating generally vertical fractures through said low permeability interbed land into said target stratum, thereby permitting oil within said target stratum to be extracted via thermally assisted gravity drainage or vapor-assisted petroleum injection.

7. A process as defined in claim 1, comprising the further step of collecting additional information and data on a generally continuous basis to monitor the position and spread of the slurried wastes within the target stratum and controlling said delivery of slurried wastes on the basis of said additional information and data.

8. A process as defined in claim 7, wherein said monitoring is carried out through the use of surface deformation information, comprising an array of surface tilt meters in the region around the injection well.

9. A process as defined in claim 7, wherein said monitoring is to be carried out by micro-seismic monitoring in the region surrounding the injection well.

10. A process as defined in claim 7, wherein bottom hole pressure within the injection well is analyzed by one or both of pressure fall of analysis and fracture propagation analysis.

11. A process as defined in claim 1, wherein said slurry is tagged with a marker for identification in the event a breakthrough develops through adjacent production wells, in which event the slurry injection process is shut down.

12. A process as defined in claim 1, wherein said waste comprises sandy waste or viscous fluid wastes or oily sludge, and the injection rate of said sandy wastes is maintained so that the depletion index comprising total sand, water and oil production divided by total sand, water and slop injection is maintained at 1.0±25%, following an initial period during which the depletion index may be higher than 1.0.

13. A process as defined in claim 12, wherein said depletion index divided by said total injection is maintained at 1.0±10%.

14. A process as defined in claim 13, wherein the concentration of viscous oils and other liquids within the slurry is sufficiently high to provide suitable blocking of channels within the target stratum, but not sufficiently high to lead to undesirable hydraulic fracture induced channels within the target stratum.

15. A process as defined in claim 14, comprising the further step of monitoring the degree of channel blocking and hydraulic fracturing channeling on a continuous basis during said injection process.

16. A process as defined in claim 1, wherein said production well is maintained at close to pumped off conditions for minimizing the sand volumes produced during the process. In order to achieve this, the production well is arranged to recycle oil down the annulus during the period that the sand slugs.

17. A process as defined in claim 1, wherein said slurried wastes comprise a viscous waste oil component in sufficient concentration to generally block the channels formed within a target stratum.

18. A process for enhanced oil recovery from within a target stratum comprising the steps of:

selection of a target stratum comprising permeable, porous, unconsolidated and laterally continuous hydrocarbon bearing sandstones;

providing at least one oil production well entering into said target stratum;

providing at least one injection well separate from said production well in the region of said production well;

providing a supply of slurried wastes comprising oily sludge and one or both of sand or viscous liquids;

delivering said slurried wastes into the target stratum through said injection well at formation fracture pressure in a series of discreet injection episodes separated by interinjection episodes;

monitoring on a continuous basis bottom hole pressure ("bhp") of the injection well and terminating said injection episodes upon determining an increase in the bhp above a first selected level and initiating said injection episodes upon determining a drop in bhp below a second select level; and recovering desirable hydrocarbons through said production well or wells.

19. The process as defined in claim 18, wherein said slurry comprises a sand slurry having a water component of between 40 and 95% by volume.

20. A process as defined in claim 19, wherein said water component is between 50 and 90% by volume.

* * * * *

UNITED STATES PATENT AND TRADEMARK OFFICE
CERTIFICATE OF CORRECTION

| | | |
|---|---|---|
| PATENT NO. | : 7,069,990 B1 | Page 1 of 1 |
| APPLICATION NO. | : 10/031195 | |
| DATED | : July 4, 2006 | |
| INVENTOR(S) | : Roman Bilak | |

It is certified that error appears in the above-identified patent and that said Letters Patent is hereby corrected as shown below:

In Column 11, line 7, the word "land" be changed to --and--.

Signed and Sealed this

Twelfth Day of September, 2006

JON W. DUDAS
*Director of the United States Patent and Trademark Office*